J. H. GLAUBER, DEC'D.
THE CITIZENS SAVINGS & TRUST COMPANY, EXECUTOR.
WATER DISTRIBUTING DEVICE.
APPLICATION FILED FEB. 9, 1914.
1,191,888.
Patented July 18, 1916.
2 SHEETS—SHEET 1.
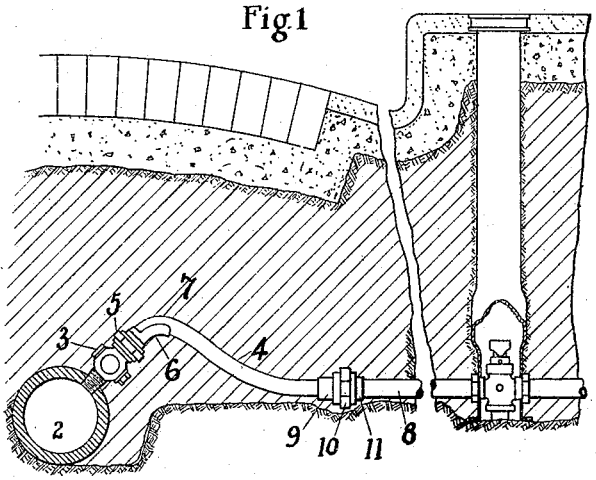
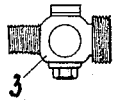
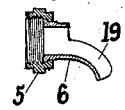
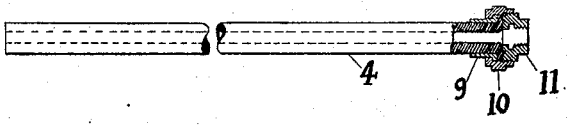
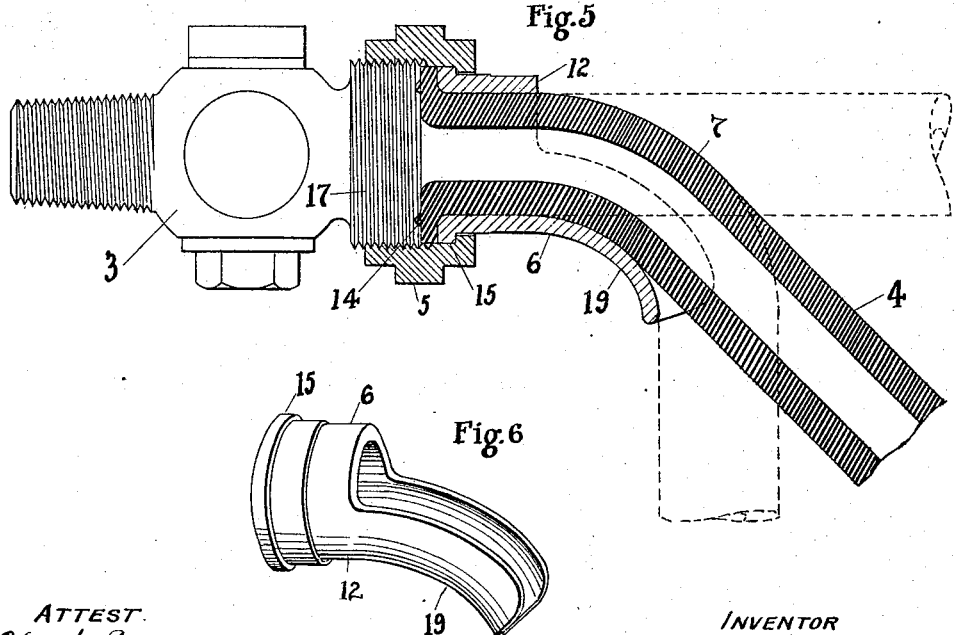
ATTEST
H. H. George
F. C. Harrold
INVENTOR
Joseph H. Glauber
BY Fisher & Moser ATT'YS.

J. H. GLAUBER, DEC'D.
THE CITIZENS SAVINGS & TRUST COMPANY, EXECUTOR.
WATER DISTRIBUTING DEVICE.
APPLICATION FILED FEB. 9, 1914.

1,191,888.

Patented July 18, 1916.
2 SHEETS—SHEET 2.

ATTEST
H. H. George.
J. C. Harrold.

INVENTOR
Joseph H. Glauber

By Fisher & ____ ATTYS.

UNITED STATES PATENT OFFICE.

JOSEPH H. GLAUBER, OF CLEVELAND, OHIO; THE CITIZENS SAVINGS & TRUST COMPANY EXECUTOR OF SAID GLAUBER, DECEASED.

WATER-DISTRIBUTING DEVICE.

1,191,888.      Specification of Letters Patent.      Patented July 18, 1916.

Application filed February 9, 1914. Serial No. 817,413.

*To all whom it may concern:*

Be it known, that I, JOSEPH H. GLAUBER, citizen of the United States, residing at Cleveland, in the county of Cuyahoga and State of Ohio, have invented certain new and useful Improvements in Water-Distributing Devices, of which the following is a specification.

This invention relates to improvements in water-distributing devices, and the improvement comprises a supporting member for a flexible pipe connection, particularly a flanged lead pipe connection in a cock or coupling, all substantially as herein shown and described and particularly pointed out in the claims.

The usual water supply system for dwellings comprises a lead pipe, more or less extended in length and commonly known as a goose-neck, which connects with a corporation cock tapped into the main water pipe in the street. The connection between the pipe and cock is often made by developing a soft metal flange out of the lead pipe and using a union or coupling nut to make a water-tight joint. The bends in the pipe which give it its name are usually developed to accommodate different settings and allow for expansion and contraction, the installation being usually several feet underground. The bends may be more or less acute or the pipe may be left straight at the cock according to conditions and the desired setting.

The present invention is designed to provide a supporting and bending member for the pipe at the cock or coupling or any other point in the pipe and this member is particularly constructed to permit a straight section of pipe to be sleeved therein and to permit a lead flange to be formed in the pipe after such sleeved relations have been established and before bending the pipe.

The device is also designed to prevent the flattening or collapsing of the pipe when the bend is formed and thereafter so as to maintain a full water-way, and other objects are also embodied in the invention as hereinafter more fully set forth.

Figure 7:
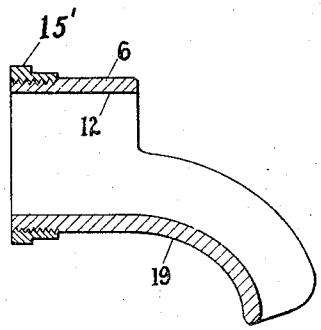
Figure 8:
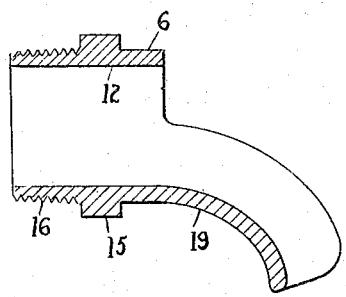
Figure 9:
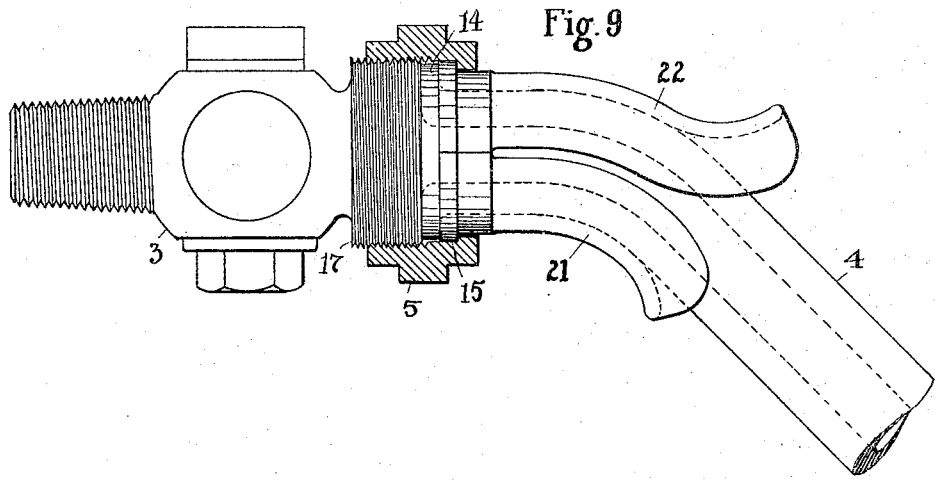

In the accompanying drawings, Figure 1 is a sectional view of a water main and a goose-neck connection with my improved supporting member embodied therein. Fig. 2 is a side view of a corporation cock; Fig. 3 is a sectional view of a coupling nut and my improved tail-piece; and Fig. 4 is a side view of a lead-pipe or goose-neck with a lead flange connection at one end. Fig. 5 is a side view of a cock and a sectional view of a piece of bent lead pipe connected in supporting relation therewith by a coupling nut and my improved tail piece. Fig. 6 is a perspective view of the tail piece alone, and Fig. 7 is a sectional view of a similar tail-piece with a screw collar. Fig. 8 is a sectional view of a tail-piece with a threaded end, and Fig. 9 illustrates a two-piece or sectional tail-piece.

Referring to Fig. 1, the water main 2 is shown as having a corporation cock 3 tapped therein at an angle, and the lead pipe or goose-neck 4 is secured to said cock by a union or coupling nut 5 in which a separate member 6 affords a curved tail piece to support the bent connecting end 7 of the pipe. The opposite end of the pipe is shown as connected to an iron service pipe 8 by a lead flange connection comprising a straight tail piece 9, a nut 10, and a spud 11. Member 6 in its most practical form comprises a short straight tubular section 12 adapted to sleeve snugly upon the lead pipe 4 when the said pipe is straight. The pipe is first inserted in the sleeve or section 12, and then a sealing flange 14 is developed at its end by the use of flanging tools.

Member 6 is provided with a solid annular collar 15 to back the lead flange, and the straight section 12 is designed to be of ample length to permit the coupling nut 16 to be pushed back far enough to clear the collar so that the lead flange may be easily developed and trimmed. When this operation is finished the coupling nut 16 may be carried forward and screwed upon the threaded enlargement 17 of the corporation cock 18 until a water-tight union is assured. The pipe 4 may then be bent to accommodate the kind of setting desired without affecting such union, bending of the pipe being facilitated and the pipe being supported at the bend therein by the downwardly curved lip or extension 19 on member 6. This extension is semi-circular in cross section to seat the lower round half of the pipe, and the side walls of the extension extend to or above the center line of the pipe to restrain the tendency of the pipe to bulge out laterally and flatten where the bend occurs and which if permitted would diminish the water-way. The lip or extension 19 is also preferably but not necessarily, of a graduated curvature, that is, the downwardly-bent portion beginning at the straight section 12 is of greater radius than the outer end thereof, which permits the pipe to be easily bent at the start and to extend at an obtuse angle, say one-eighth of a bend, see full lines Fig. 5, or to be bent at right angles,— quarter bend, as shown in dotted lines in said figure. In either case the curved tail-piece serves as a former for bending the pipe to the desired angle without kinking the pipe and at the same time this member will effectively support the pipe at a vulnerable point of strain in the connection or in other words at the point of union with the cock, so that settling of the pipe beyond the coupling will not affect the joint nor collapse the pipe at the bend. The lip or extension being open in its upper portion, there is absolutely no interference or trouble in assembling the parts, nor in swedging and forming the lead flange, and the workman can perform this operation conveniently in or out of the trench. If reaming of the straight tubular portion is found necessary to enlarge the same for a slightly larger pipe the lip will not interfere as its location is at one side of the axial center of the straight section 12. Member 6 is also constructed to fit the corporation cocks and couplings of standard size in general use, and may be manufactured and sold as a separate article and as an attachment for such devices, and the article is not limited to the field of use described but may be used with advantage in other installations where bent pipes are found necessary. Member 6 may also have a screw collar 15' (see Fig. 7) in lieu of an integral collar to permit the said member to be detached from the coupling nut and cock and slipped back over the straight pipe to any desired point where it may be used as a former in making a short bend. Fig. 8 shows a tail-piece 6 provided with a threaded end 16, and Fig. 9 illustrates a two-part tail-piece comprising separable upper and lower curved sections 21 and 22, respectively, which are seated oppositely on the pipe to protect the bend in the pipe.

Other modifications might also be made without departing from the inventive concept or the breadth and scope of the claims.

What I claim is:

1. In a water distributing device, an attachment for a pipe comprising a short tubular section adapted to sleeve upon the pipe having a lip curved to one side thereof, said lip being segmental in cross section to provide an open channel the full length thereof.

2. In a water distributing device, a separable member for a pipe comprising an annular sleeve having a curved end extension of substantially semi-circular formation at its end and open the full length thereof at its top in cross section to form and seat a bend in the pipe.

3. In a water distributing device, a separable member for a pipe comprising a sleeve having an end lip of graduated curvature and open at its top the full length thereof and of uniform size in cross section its full length to form and support a bend in the pipe.

4. In a water distributing device, a coupling connection for a pipe comprising a sleeve having an annular collar at one end and a channeled lip at its other end, which is open at its top the full length thereof, said collar and lip being integral in combination with a coupling nut adapted to rotatably engage and confine said collar.

5. In a water distributing device, a coupling body and a nut therefor, and a tail-piece having a shouldered portion engaged by said nut and provided with a downwardly curved lip, in combination with a lead pipe sleeved within said tail piece in bent seating relation with said lip and having an outwardly-extending flanged end in abutting relation with said collar and coupling body.

6. In a water distributing device, a separate article of manufacture and sale for cocks and coupling members, comprising a relatively short tubular tail-piece having an annular end collar and a channeled integral extension at one end thereof and open at one side.

7. In a water distributing device, a separate article of manufacture and sale for cocks and coupling members, comprising a relatively short tubular tail-piece having an annular end collar and a curved and channeled integral extension projecting on curved lines to one side of the axial center thereof, said extension being open its full width from end to end.

8. In a water distributing device, the combination of a coupling body, a union nut, and a curved tail-piece of semi-circular form at its outer end portion open on one side, with a flanged lead pipe having a bend seated within said curved tail-piece.

In testimony whereof I affix my signature in presence of two witnesses.

JOSEPH H. GLAUBER.

Witnesses:
R. B. MOSER,
F. C. HARROLD.

Copies of this patent may be obtained for five cents each, by addressing the "Commissioner of Patents, Washington, D. C."